United States Patent

[11] 3,567,966

[72] Inventors Lyman F. Gilbert
Somers;
William W. Landon, Jr., Andover, Conn.
[21] Appl. No. 720,060
[22] Filed Apr. 10, 1968
[45] Patented Mar. 2, 1971
[73] Assignee Combustion Engineering, Inc.
Windsor, Conn.

[54] TRANSIENT SUPPRESSION CIRCUIT
7 Claims, 1 Drawing Fig.

[52] U.S. Cl. .......... 307/234,
307/231, 307/235, 307/236, 307/318, 328/111,
328/165
[51] Int. Cl. .......... H03k 5/20
[50] Field of Search .......... 307/231,
233, 234, 237, 265, 318, 235, 236; 328/111, 112,
165, 167

[56] References Cited

UNITED STATES PATENTS

| | | | |
|---|---|---|---|
| 2,871,379 | 1/1959 | Ingham | 307/234 |
| 2,987,633 | 6/1961 | Pallas | 307/234 |
| 3,132,263 | 5/1964 | Maass | 328/112X |
| 3,219,838 | 11/1965 | Hurst | 307/234 |
| 3,243,604 | 3/1966 | Johnson | 328/167X |
| 3,333,268 | 7/1967 | Brocato et al. | 307/237X |
| 3,426,284 | 2/1969 | Dann | 307/235X |
| 3,390,282 | 6/1968 | Cancro et al. | 307/260 |
| 3,501,649 | 3/1970 | Webb | 307/246X |

OTHER REFERENCES

Pub. I " Clipping Level Detector" by Dersch in IBM TECH DISCLOSURE BULLETIN Vol. 3 No. 11 April 1961 page 34

*Primary Examiner*—Stanley D. Miller, Jr.
*Attorney*—Fishman and Van Kirk

ABSTRACT: Solid-state circuitry for coupling input signals of relatively long duration to a logic system, the circuitry comprising an integrator which, in response to input signals of the proper magnitude, duration and polarity, provides a ramp voltage to a level detector. Improved transient suppression is achieved by employing input signals to provide, after integration, the base and collector drive for an input transistor. The circuitry is also characterized by adjustable turn on and turn off times which may be made symmetrical if desired.

PATENTED MAR 2 1971 3,567,966
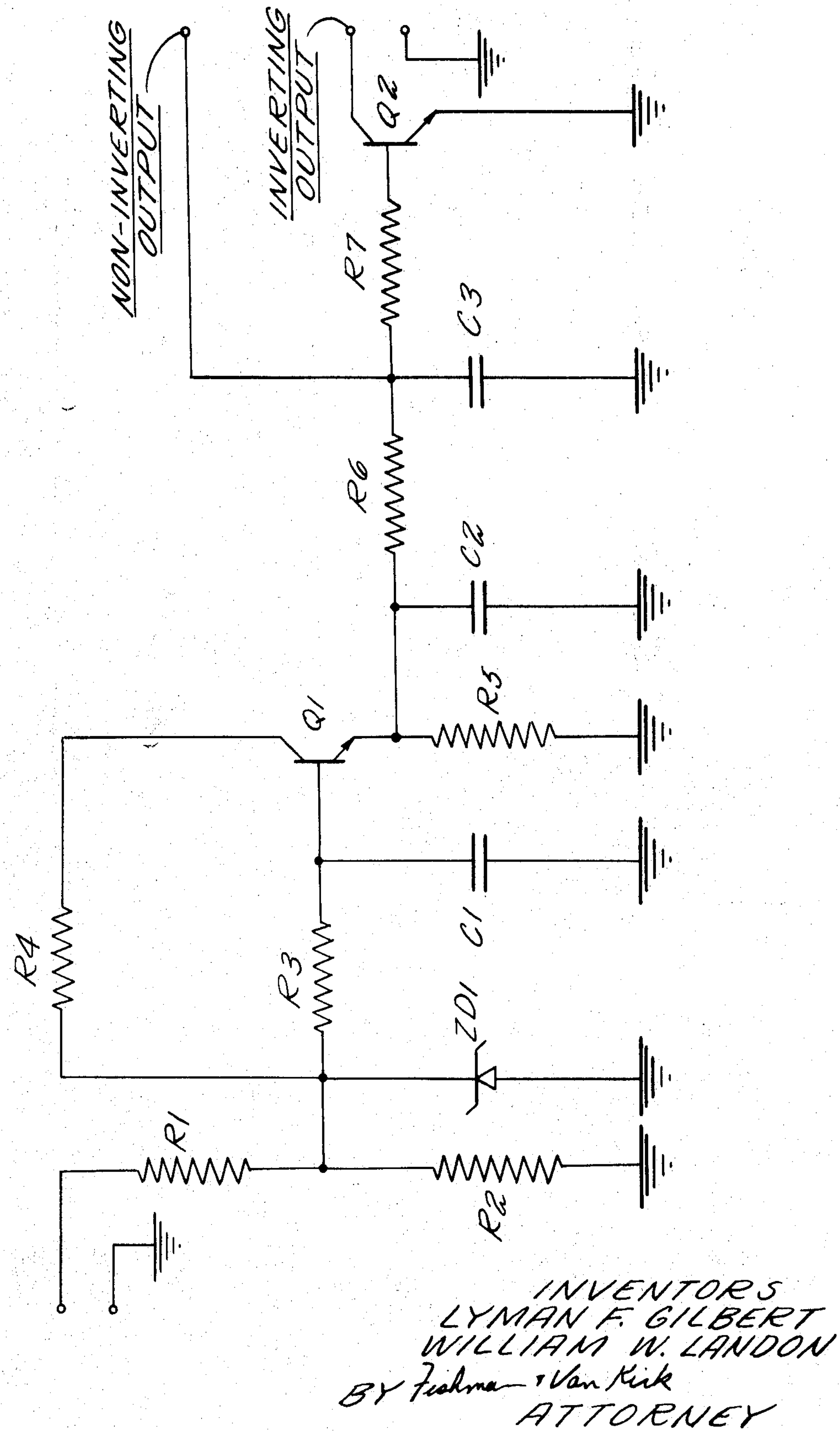
INVENTORS
LYMAN F. GILBERT
WILLIAM W. LANDON
BY Fishman & Van Kirk
ATTORNEY

TRANSIENT SUPPRESSION CIRCUIT

BACKGROUND OF THE INVENTION

1. Field of the Invention

The present invention relates to the coupling of "information bearing signals" to logic systems. More particularly, the present invention is directed to a solid state input module which will suppress incoming transients and couple only those signals having a desired magnitude and a duration greater than a predetermined period to the logic system. Accordingly, the general objects of the present invention are to provide novel and improved methods and apparatus of such character.

2. Description of the Prior Art

While not limited thereto in its utility, the present invention has been found to be particularly well suited for interpositioning between condition responsive elements which, when operated provide steady state output signals, and digital circuitry which operates on the signals provided by the condition responsive elements to generate control information or to provide alarm signals. In the typical situation the condition responsive elements, which for purposes of explanation may be considered to be limit switches or the like, will be located remotely from the control or logic system for which they provide informational input signals and will be connected to the logic system by means of conductors. These interconnecting conductors will usually lie in a wiring tray along with other wiring and thus are susceptible to having noise signals induced therein. As is well known, these noise signals or transients will be of short duration but may be of considerable magnitude. Also, where the condition responsive element is a switch, transients are generated upon the opening or closing thereof as, for example, by contact bounce. These switching and/or other transients, if passed to the logic system will often be accepted by the logic system as information bearing inputs thus resulting in improper overall system operation.

In the prior art, attempts have been made to suppress transients at the input to the logic system. Such transient suppression units have come to be called input modules. Prior art input modules have, however, been deficient from the standpoint of performance. One of the major disadvantages of prior art input modules has been the fact that transients, particularly fast rising wave fronts, would bias (switch) the module input transistors into the conductive state and thus such transients would cause false information to be received by the logic system.

SUMMARY OF THE INVENTION

The present invention overcomes the above-discussed and other disadvantages of the prior art by providing a novel solid state input module which will suppress transients regardless of their wave shape and magnitude. The input module of the present invention comprises a ramp voltage generator including a first or input transistor, a low pass filter and, when desired, an output stage employing a second transistor which functions as a level detector. The input transistor is not connected to an energy source and thus will normally have no base drive. Accordingly, incoming short term transients, regardless of magnitude, cannot provide enough energy to bias the input transistor into conduction and thus these transients will not be passed on to the logic system. Passive circuit elements in the module may be chosen so that the input module of the present invention has symmetrical turn on and turn off delay times thus eliminating the effects of contact bounce in the condition responsive elements. If desired, nonsymmetrical turn-on and turn-off times may be obtained by different values of the passive elements.

BRIEF DESCRIPTION OF THE DRAWING

The present invention may be better understood and its numerous advantages will become apparent to those skilled in the art by reference to the accompanying drawing which comprises a schematic of a preferred embodiment of the invention.

DESCRIPTION OF THE PREFERRED EMBODIMENT

Input signals to the present invention, for example as provided by a remotely located limit switch, will be impressed across a voltage divider comprising resistors R1 and R2. A logic system will have one of its logic circuit inputs connected across the output terminals of the present invention. Restated, a logic system input circuit will, in the case where an inverting output is desired, be connected between the collector and emitter of level detector transistor Q2. As will be discussed below, when a noninverting output is desired, the logic system input circuit will be connected between the output of a low pass filter and ground. In the case of the preferred embodiment which is being described, the logic unit will be responsive to steady state signals. In the context of this disclosure, a steady state signal is any signal having a duration longer than the combined time constants of the module circuitry, for example 50 milliseconds.

Signals appearing at the junctions of resistors R1 and %R2 are applied, via resistor R3, to the base of input transistor Q1. The junction between resistor R3 and the voltage divider is connected to ground via Zener diode ZD1. Zener diode ZD1 clips any positive going pulse that exceeds the Zener rating and drives all negative going pulses to ground. The current limiting action of resistor R1 and diode ZD1 thus limits the available impulse noise energy to a low order of magnitude thereby preventing overdrive of the module. Accordingly, since the module can only have a finite driving potential, it is purely time dependent. The base of transistor Q1 is coupled to ground by capacitor C1 and thus the positive input signals which pass ZD1 are initially shorted to ground through the low impedance of capacitor C1. Accordingly, it may be seen that the combined action of diode ZD1 and capacitor C1 effectively short circuits short duration transients.

It is to be noted that input transistor Q1 has no applied energy source and thus normally has no base or collector drive. Power for the operation of transistor Q1 must come from the condition responsive device connected across the input terminals of the present invention. Upon application of a positive input signals, whether transient or steady state, capacitor C1 will begin to charge and transistor Q1 will begin to conduct. The rate at which capacitor C1 charges and thus the rate at which the base current flow through transistor Q1 increases is determined by the RC time constant of the integrator or ramp voltage generator circuit comprising capacitor C1 and resistor R3.

Transistor Q1 is connected as an emitter follower and a ramp output voltage is developed across emitter resistor R5 in response to ramp voltage input signals applied to its base. Since transistor Q1 is supplied with drive from the monitored device, short duration input signals cannot bias the transistor to a highly conductive condition, but will merely initiate the generation of a ramp voltage regardless of the magnitude of the applied input voltage. The collector resistor R4 of transistor Q1 functions as a current limiting resistor which serves to protect transistor Q1 and also to limit the initial charging rate of capacitor C2 which is connected in parallel with emitter resistor R5. Accordingly, the combination of transistor Q1, resistors R4 and R5 and capacitor C2 defines a second, series connected ramp voltage generator.

The ramp voltage developed across transistor Q1 emitter resistor R5 is applied to an RC time delay circuit or $\pi$-type flow pass filter comprising resistor R6 and capacitors C2 and C3. As may be seen, the junction of resistor R6 and capacitor C2 is connected to the emitter of transistor Q1. Resistor R6 and capacitor C3 function as a third ramp voltage generator. The output of this third ramp voltage generator is connected to a noninverting output terminal and, via resistor R7, to the base of inverting level detector transistor Q2. The low pass filter-time delay circuit serves to nullify the effects of distributed capacitance in transistor Q1 which could pass sufficient impulse energy to switch level detector transistor Q2 on. The combination of the second ramp voltage generator and the low pass filter integrates the applied input signals.

As noted above, transistor Q2 functions as a level detector and thus the semiconductor cannot conduct until its base voltage reaches a predetermined level. Should the input signal be of the proper polarity and have sufficient magnitude and time duration to enable the ramp voltage to build up to this predetermined level, transistor Q2 will turn on. It is to be noted that the emitter of transistor Q2 is grounded and thus when transistor Q2 turns on it saturates and the voltage between its collector and emitter drops to near zero. The effective grounding of the collector of transistor Q2 provides an inverted output signal to which the logic system may be responsive. As noted above, a noninverting output may also be taken from the output of the low pass filter as shown. By properly sizing the passive circuit components of the present invention, the delay time and thus the upper frequency limit of signals which will be passed by the circuit may be selectively adjusted. It is particularly to be noted that the inclusion and proper sizing of resistors R6 and R7 affect the symmetry of inverting operation and may be adjusted to provide symmetry by causing the turn on and turn off delay times to be equal. It is generally desirable to have a turn off delay to compensate for switching transients generated during the opening of switches which may be connected across the input terminals to the module.

While a preferred embodiment has been shown and described, various modifications and substitutions may be made thereto without departing from the spirit and scope of this invention. Accordingly, it is to be understood that the present invention has been described by way of illustration and not limitation.

We claim:

1. A transient suppression circuit comprising:

an input signal-powered transistor, said transistor being normally nonconductive and without base and collector drive;

means for coupling input signals to the base of said input transistor, said coupling means including an integrator circuit which presents substantially a short circuit to short duration input signals applied thereto;

Zener diode means connected across the input to said coupling means whereby said transistor will be rendered conductive only in response to input signals of long duration and a first polarity;

an output terminal; and means connected between the emitter of said transistor and said output terminal for delaying the application to said output terminal of output signals provided by said transistor when it is rendered conductive in response to input signals of sufficient duration and the proper polarity.

2. The circuit of claim 1 wherein said input transistor is connected as an emitter follower and wherein said delay means comprises a low pass filter.

3. The circuit of claim 2 wherein said filter comprises: input and output capacitors, said input capacitor having a plate connected to the emitter of said transistor.

4. The circuit of claim 3 further comprising: means for limiting the charging rate of the input capacitor of said filter.

5. The circuit of claim 4 wherein said charging rate limiting means comprises:

resistance means connected between the collector of said transistor and the input of said coupling means.

6. The circuit of claim 5 wherein said delay means further comprises:

level detector means connected between the output of said low pass filter and said output terminal.

7. The circuit of claim 6 wherein said level detector means comprises:

a second normally nonconductive transistor, said second transistor having a grounded emitter and having its collector coupled to said output terminal; and resistance means connecting the output of said filter to the base of said second transistor.